US012463530B2

(12) United States Patent
Yeh et al.

(10) Patent No.: US 12,463,530 B2
(45) Date of Patent: Nov. 4, 2025

(54) TOTEM-POLE PFC CIRCUIT AND CONTROL METHOD THEREOF

(71) Applicant: Delta Electronics, Inc., Taoyuan (TW)

(72) Inventors: Yung-Sheng Yeh, Taoyuan (TW); Chih-Wei Liang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 208 days.

(21) Appl. No.: 18/372,010

(22) Filed: Sep. 22, 2023

(65) Prior Publication Data

US 2024/0113617 A1 Apr. 4, 2024

Related U.S. Application Data

(60) Provisional application No. 63/411,440, filed on Sep. 29, 2022.

(30) Foreign Application Priority Data

Aug. 7, 2023 (CN) .......................... 202310984064.9

(51) Int. Cl.
*H02M 1/42* (2007.01)
*H02M 1/00* (2006.01)
*H02M 1/08* (2006.01)

(52) U.S. Cl.
CPC ....... *H02M 1/4233* (2013.01); *H02M 1/0012* (2021.05); *H02M 1/081* (2013.01)

(58) Field of Classification Search
CPC .. H02M 1/4233; H02M 1/0012; H02M 1/081; H02M 1/42
See application file for complete search history.

(56) References Cited

U.S. PATENT DOCUMENTS 10,312,799 B1 6/2019 Turchi et al.
2010/0149846 A1* 6/2010 Tan ..................... H02M 7/5387
  363/132
2021/0006149 A1* 1/2021 Zong ..................... H02M 1/126
(Continued)

FOREIGN PATENT DOCUMENTS

CN 102185504 A 9/2011
CN 214755496 U 11/2021
(Continued)

*Primary Examiner* — Monica Lewis
*Assistant Examiner* — Lakaisha Jackson
(74) *Attorney, Agent, or Firm* — KIRTON McCONKIE; Evan R. Witt

(57) ABSTRACT

A totem-pole PFC circuit and a control method thereof are provided. The circuit includes an AC power source, first and second bridge arms and a controller. The first bridge arm includes first and second switches electrically connected in series with a connection node electrically connected to a first terminal of the AC power source. The second bridge arm includes third and fourth switches electrically connected in series with a connection node electrically connected to a second terminal of the AC power source. When a potential at the first terminal is higher than a potential at the second terminal, the controller turns off the fourth switch if the L-phase voltage is lower than a first threshold voltage. When the potential at the first terminal is lower than the potential at the second terminal, the controller turns off the third switch if the L-phase voltage is higher than a second threshold voltage.

8 Claims, 3 Drawing Sheets

(56) References Cited

U.S. PATENT DOCUMENTS

2022/0200445 A1\* 6/2022 Ren .................... H02M 1/4233
2023/0353046 A1\* 11/2023 Guo ................... H02M 1/4233
2024/0014733 A1\* 1/2024 Chin .................. H02M 1/0054

FOREIGN PATENT DOCUMENTS

| CN | 110165883 B | 3/2022 |
|---|---|---|
| TW | 201517475 A | 5/2015 |
| TW | 202038038 A | 10/2020 |
| WO | 2022165485 A1 | 8/2022 |

\* cited by examiner

TOTEM-POLE PFC CIRCUIT AND CONTROL METHOD THEREOF

CROSS-REFERENCE TO RELATED APPLICATION

This application claims the benefit of U.S. Provisional Application No. 63/411,440 filed on Sep. 29, 2022, and entitled "ORING FET CONTROL CIRCUIT AND CONTROL METHOD FOR TOTEM-POLE PFC". This application also claims priority to China Patent Application No. 202310984064.9 filed on Aug. 7, 2023. The entire contents of the above-mentioned patent applications are incorporated herein by reference for all purposes.

FIELD OF THE INVENTION

The present disclosure relates to a PFC (power factor correction) circuit and a control method thereof, and more particularly to a totem-pole PFC circuit and a control method thereof.

BACKGROUND OF THE INVENTION

In conventional control method for the slow transistor of the totem-pole PFC circuit, the input power is provided to the AD pin of the microprocessor through the L-phase and N-phase voltage detection circuits respectively and being divided by resistors. The microprocessor calculates to obtain the AD value, compares the AD value with a predetermined value, and controls the slow transistor according to the comparison result.

However, the microprocessor should take a certain period of time to calculate the AD value. Accordingly, when the input voltage undergoes a rapid change in phase, the slow transistor may be turned on in the incorrect phase due to insufficient response time, which may further result in problems such as short circuit or damage to components.

Therefore, there is a need of providing a totem-pole PFC circuit and a control method thereof in order to overcome the drawbacks of the conventional technologies.

SUMMARY OF THE INVENTION

The present disclosure provides a totem-pole PFC circuit and a control method thereof in which only the L-phase voltage of the input power needs to be detected and the turn-off timing of the slow switch is controlled through comparing the L-phase voltage with the threshold voltage. Therefore, the response speed is faster, and even when the input voltage undergoes a rapid change in phase, the phase change is detected and the corresponding slow switch is turned off immediately.

In accordance with an aspect of the present disclosure, a totem-pole PFC circuit is provided. The totem-pole PFC circuit includes an AC power source, a first bridge arm, a second bridge arm and a controller. The first bridge arm includes a first switch and a second switch electrically connected in series, and a connection node between the first switch and the second switch is electrically connected to a first terminal of the AC power source. The second bridge arm includes a third switch and a fourth switch electrically connected in series, and a connection node between the third switch and the fourth switch is electrically connected to a second terminal of the AC power source. The controller is configured to control operation of the first to fourth switches. The controller detects a L-phase voltage of the AC power source. When a potential at the first terminal is higher than a potential at the second terminal, the controller turns off the fourth switch if the L-phase voltage is lower than a first threshold voltage. When the potential at the first terminal is lower than the potential at the second terminal, the controller turns off the third switch if the L-phase voltage is higher than a second threshold voltage.

In accordance with another aspect of the present disclosure, a control method of totem-pole PFC circuit is provided. The control method comprises: (a) providing a totem-pole PFC circuit including an AC power source, a first bridge arm and a second bridge arm, wherein the first bridge arm includes a first switch and a second switch electrically connected in series, a connection node between the first switch and the second switch is electrically connected to a first terminal of the AC power source, the second bridge arm includes a third switch and a fourth switch electrically connected in series, and a connection node between the third switch and the fourth switch is electrically connected to a second terminal of the AC power source; (b) detecting a L-phase voltage of the AC power source; (c) when a potential at the first terminal is higher than a potential at the second terminal, turning off the fourth switch if the L-phase voltage is lower than a first threshold voltage; and (d) when the potential at the first terminal is lower than the potential at the second terminal, turning off the third switch if the L-phase voltage is higher than a second threshold voltage.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
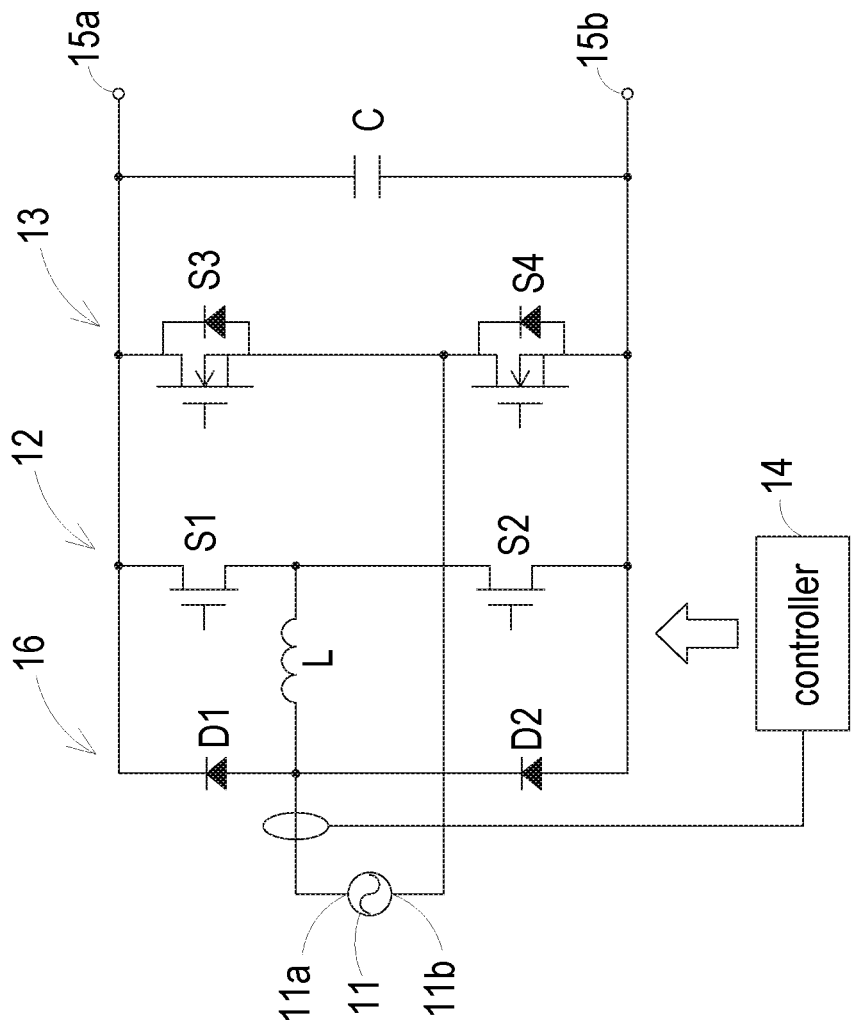
FIG. 1 is a schematic circuit diagram illustrating a totem-pole PFC circuit according to an embodiment of the present disclosure.

FIG. 1 is a schematic circuit diagram illustrating a totem-pole PFC (power factor correction) circuit according to an embodiment of the present disclosure. As shown in FIG. 1, the totem-pole PFC circuit 1 includes an AC power source 11, a first bridge arm 12, a second bridge arm 13, and a controller 14 and has a positive output terminal 15a and a negative output terminal 15b. The first bridge arm 12 includes a first switch S1 and a second switch S2 electrically connected in series. The connection node between the first switch S1 and the second switch S2 is electrically connected to a first terminal 11a of AC power source 11, and the first switch S1 and the second switch S2 are coupled to the positive output terminal 15a and the negative output terminal 15b respectively. The first switch S1 and the second switch S2 function as fast switches in the totem-pole PFC circuit 1. The second bridge arm 13 includes a third switch S3 and a fourth switch S4 electrically connected in series. The connection node between the third switch S3 and the fourth switch S4 is electrically connected to a second terminal 11b of AC power source 11, and the third switch S3 and the fourth switch S4 are coupled to the positive output terminal 15a and the negative output terminal 15b respectively. The third switch S3 and the fourth switch S4 function as slow switches in the totem-pole PFC circuit 1. The controller 14 is configured to control the operation of all the switches. It is noted that the first switch S1, the second switch S2, the third switch S3, and the fourth switch S4 are not limited to the switch type as shown in FIG. 1 and may be metal-oxide-semiconductor field-effect transistors or any suitable transistors.

In an embodiment, the totem-pole PFC circuit 1 further includes an inductor L, a third bridge arm 16, and a capacitor C. Two terminals of the inductor L are electrically connected to the first terminal 11a of AC power source 11 and the connection node between the first switch S1 and the second switch S2 respectively. In other words, the connection node between the first switch S1 and the second switch S2 is electrically connected to the first terminal 11a of AC power source 11 through the inductor L. The third bridge arm 16 includes a first diode D1 and a second diode D2 electrically connected in series. The cathode and anode of first diode D1 are coupled to the positive output terminal 15a and the cathode of second diode D2 respectively, the anode of second diode D2 is coupled to the negative output terminal 15b, and the connection node between the first diode D1 and the second diode D2 is electrically connected to the first terminal 11a of AC power source 11. The capacitor C is electrically connected in parallel to the first bridge arm 12, the second bridge arm 13, and the third bridge arm 16, and two terminals of the capacitor C are coupled to the positive output terminal 15a and the negative output terminal 15b respectively.

Since the present disclosure focuses on the control for slow switches, the control for fast switches may be referenced from conventional approaches and would be omitted herein.

Figure 2:
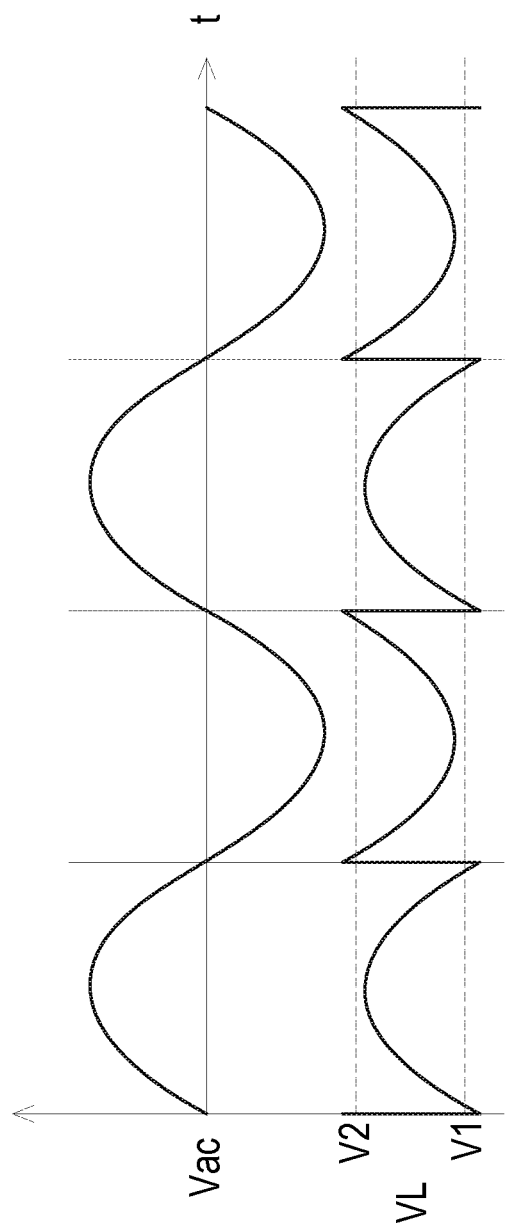
FIG. 2 exemplifies the key voltage waveforms of the totem-pole PFC circuit of FIG. 1.

Please refer to FIG. 1 and FIG. 2. FIG. 2 exemplifies the key voltage waveforms of the totem-pole PFC circuit of FIG. 1. In FIG. 2, Vac represents the input voltage provided by the AC power source 11, and VL is the L-phase (line-phase) voltage of the AC power source 11. As shown in FIG. 1 and FIG. 2, the controller 14 detects the L-phase voltage VL of the AC power source 11. When the potential at the first terminal 11a of AC power source 11 is higher than the potential at the second terminal 11b of AC power source 11 (i.e., during the positive half cycle of the input voltage Vac), the controller 14 turns off the fourth switch S4 if the L-phase voltage VL is lower than a first threshold voltage V1, and the controller 14 turns on the fourth switch S4 if the L-phase voltage VL is higher than the first threshold voltage V1. On the contrary, when the potential at the first terminal 11a of AC power source 11 is lower than the potential at the second terminal 11b of AC power source 11 (i.e., during the negative half cycle of the input voltage Vac), the controller 14 turns off the third switch S3 if the L-phase voltage VL is higher than a second threshold voltage V2, and the controller 14 turns on the third switch S3 if the L-phase voltage VL is lower than the second threshold voltage V2.

Consequently, in the present disclosure, only the L-phase voltage VL of the input power source 11 needs to be detected, and the turn-off timing of the slow switch (S3, S4) is controlled through comparing the L-phase voltage VL with the threshold voltages (V1, V2). Therefore, the response speed is faster, and even when the input voltage Vac undergoes a rapid change in phase, the phase change is detected and the corresponding slow switch (S3, S4) is turned off immediately.

In addition, the first threshold voltage V1 and the second threshold voltage V2 are close to the L-phase voltage VL at the zero-crossing point of input voltage Vac. The magnitudes of the first threshold voltage V1 and second threshold voltage V2 depend on the detection accuracy of controller 14, the output power of totem-pole PFC circuit 1, and the desired operating efficiency of totem-pole PFC circuit 1. In particular, taking the first threshold voltage V1 as an example, the controller 14 may be unable to detect if the first threshold voltage V1 is too low, and the totem-pole PFC circuit 4-1 may be unable to reach its desired output power and operating efficiency if the first threshold voltage V1 is too high.

The controller 14 may include a comparator or a microprocessor which is utilized to compare the L-phase voltage VL with the first threshold voltage V1 and second threshold voltage V2, but not exclusively.

Figure 3:
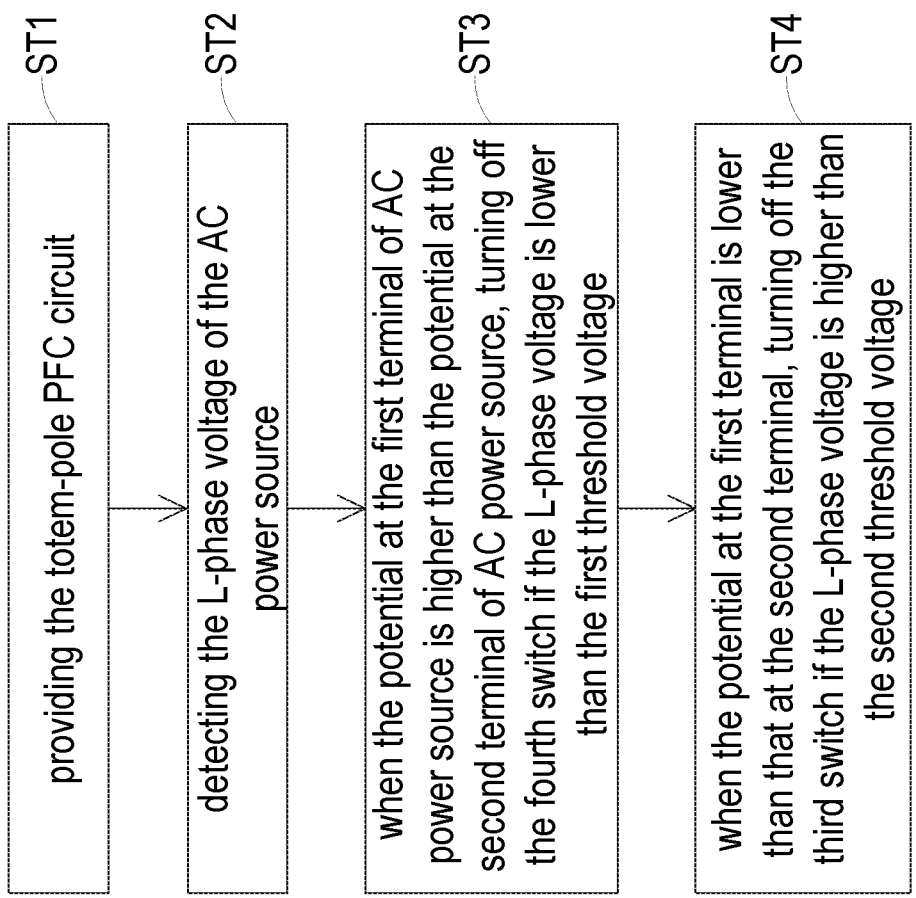
FIG. 3 is a schematic flow chart illustrating a control method of a totem-pole PFC circuit according to an embodiment of the present disclosure.

FIG. 3 is a schematic flow chart illustrating a control method of a totem-pole PFC circuit according to an embodiment of the present disclosure. The control method is applicable for the totem-pole PFC circuit 1 of the present disclosure. As shown in FIG. 3, the control method includes the following steps.

In step ST1, the totem-pole PFC circuit 1 is provided.

In step ST2, the L-phase voltage VL of the AC power source 11 is detected.

In step ST3, when the potential at the first terminal 11a of AC power source 11 is higher than the potential at the second terminal 11b of AC power source 11, the fourth switch S4 is turned off if the L-phase voltage VL is lower than the first threshold voltage V1.

In step ST4, when the potential at the first terminal 11a of AC power source 11 is lower than the potential at the second terminal 11b of AC power source 11, the third switch S3 is turned off if the L-phase voltage VL is higher than the second threshold voltage V2.

In an embodiment, the control method further includes steps of: when the potential at the first terminal 11a of AC power source 11 is higher than the potential at the second terminal 11b of AC power source 11, turning on the fourth switch S4 if the L-phase voltage VL is higher than the first threshold voltage V1; and when the potential at the first terminal 11a of AC power source 11 is lower than the potential at the second terminal 11b of AC power source 11, turning on the third switch S3 if the L-phase voltage VL is lower than the second threshold voltage V2.

In an embodiment, the control method further includes comparing the L-phase voltage VL with the first threshold voltage V1 and second threshold voltage V2 by a comparator or a microprocessor.

In summary, the present disclosure provides a totem-pole PFC circuit and a control method thereof in which only the L-phase voltage of the input power needs to be detected and the turn-off timing of the slow switch is controlled through comparing the L-phase voltage with the threshold voltage. Therefore, the response speed is faster, and even when the input voltage undergoes a rapid change in phase, the phase change is detected and the corresponding slow switch is turned off immediately.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A totem-pole PFC (power factor correction) circuit, comprising:
   an AC power source;
   a first bridge arm, comprising a first switch and a second switch electrically connected in series, wherein a connection node between the first switch and the second switch is electrically connected to a first terminal of the AC power source;
   a second bridge arm, comprising a third switch and a fourth switch electrically connected in series, wherein a connection node between the third switch and the fourth switch is electrically connected to a second terminal of the AC power source; and
   a controller, configured to control operation of the first to fourth switches,
   wherein the controller detects a first voltage of the first terminal of the AC power source, when a potential at the first terminal is higher than a potential at the second terminal, the controller turns off the fourth switch if the first voltage is lower than a first threshold voltage, and when the potential at the first terminal is lower than the potential at the second terminal, the controller turns off the third switch if the first voltage is higher than a second threshold voltage,
   wherein when the potential at the first terminal is higher than the potential at the second terminal, the controller turns on the fourth switch if the first voltage is higher than the first threshold voltage, and when the potential at the first terminal is lower than the potential at the second terminal, the controller turns on the third switch if the first voltage is lower than the second threshold voltage.

2. The totem-pole PFC circuit according to claim 1, wherein the first threshold voltage and the second threshold voltage depend on a detection accuracy of the controller, an output power of the totem-pole PFC circuit and a desired operating efficiency of the totem-pole PFC circuit.

3. The totem-pole PFC circuit according to claim 1, wherein the controller comprises a comparator or a microprocessor configured to compare the first voltage with the first threshold voltage and the second threshold voltage.

4. The totem-pole PFC circuit according to claim 1, wherein the first switch, the second switch, the third switch and the fourth switch are metal-oxide-semiconductor field-effect transistors.

5. The totem-pole PFC circuit according to claim 1, further comprising an inductor, a third bridge arm and a capacitor, wherein the connection node between the first switch and the second switch is electrically connected to the first terminal of the AC power source through the inductor, the third bridge arm comprises a first diode and a second diode electrically connected in series, a connection node between the first diode and the second diode is electrically connected to the first terminal of the AC power source, and the capacitor is electrically connected in parallel to the first bridge arm, the second bridge arm and the third bridge arm.

6. A control method of totem-pole PFC circuit, comprising:
   (a) providing a totem-pole PFC circuit comprising an AC power source, a first bridge arm and a second bridge arm, wherein the first bridge arm comprises a first switch and a second switch electrically connected in series, a connection node between the first switch and the second switch is electrically connected to a first terminal of the AC power source, the second bridge arm comprises a third switch and a fourth switch electrically connected in series, and a connection node between the third switch and the fourth switch is electrically connected to a second terminal of the AC power source;
   (b) detecting a first voltage of the first terminal of the AC power source;
   (c) when a potential at the first terminal is higher than a potential at the second terminal, turning off the fourth switch if the first voltage is lower than a first threshold voltage;
   (d) when the potential at the first terminal is lower than the potential at the second terminal, turning off the third switch if the first voltage is higher than a second threshold voltage;
   (e) when the potential at the first terminal is higher than the potential at the second terminal, turning on the fourth switch if the first voltage is higher than the first threshold voltage, and
   (f) when the potential at the first terminal is lower than the potential at the second terminal, turning on the third switch if the first voltage is lower than the second threshold voltage.

7. The control method according to claim 6, further comprising comparing the first voltage with the first threshold voltage and the second threshold voltage by a comparator or a microprocessor.

8. The control method according to claim 6, wherein the first threshold voltage and the second threshold voltage depend on a detection accuracy of detecting the first voltage, an output power of the totem-pole PFC circuit and a desired operating efficiency of the totem-pole PFC circuit.

* * * * *